July 2, 1940. W. A. STEDMAN Re. 21,502
TREATMENT OF PULPS
Original Filed Dec. 22, 1921 2 Sheets-Sheet 1
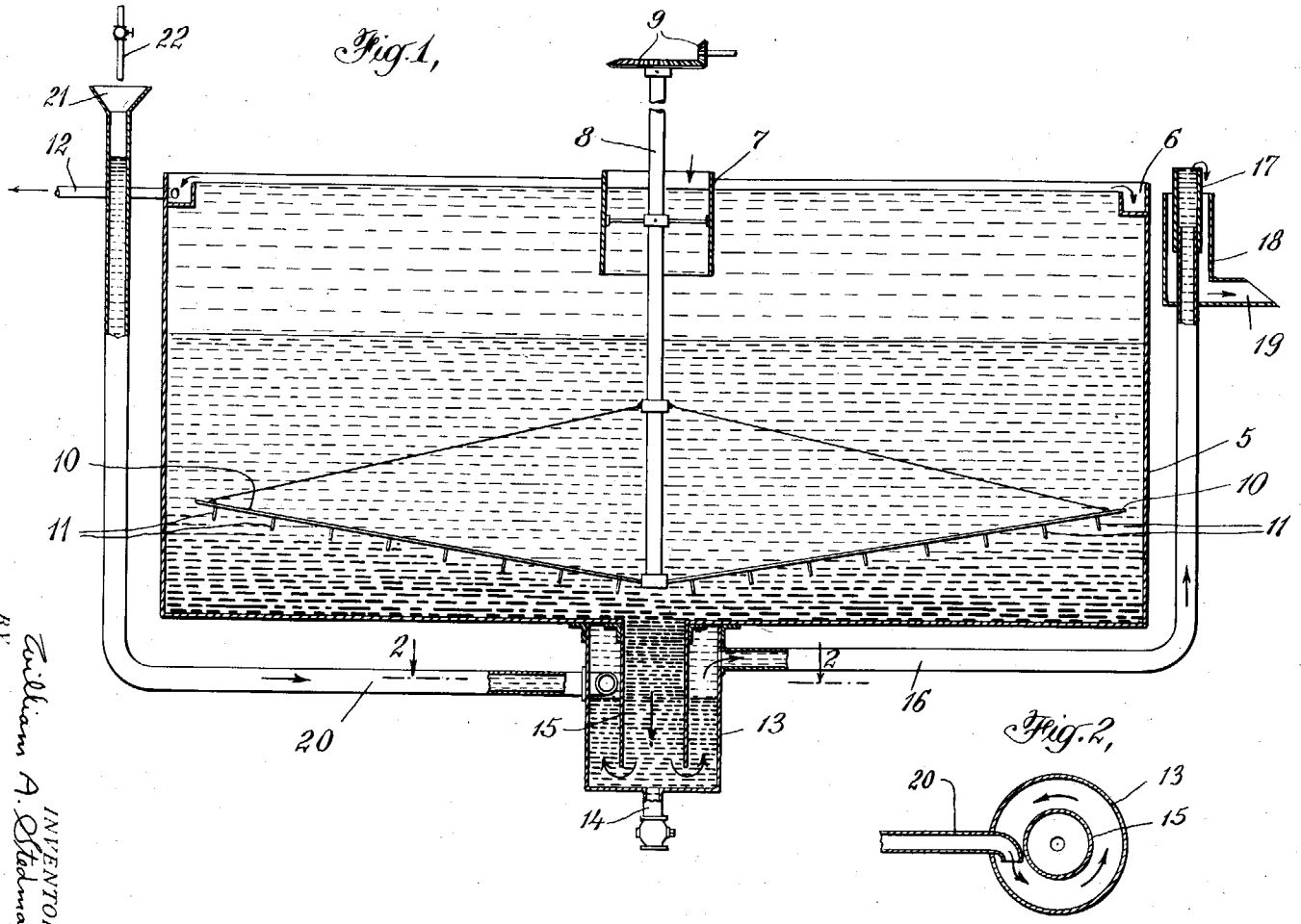
INVENTOR
William A. Stedman
BY
Pennie, Davis, Marvin & Edmonds
ATTORNEYS TREATMENT OF PULPS
Original Filed Dec. 22, 1921 2 Sheets-Sheet 2
Fig. 3,
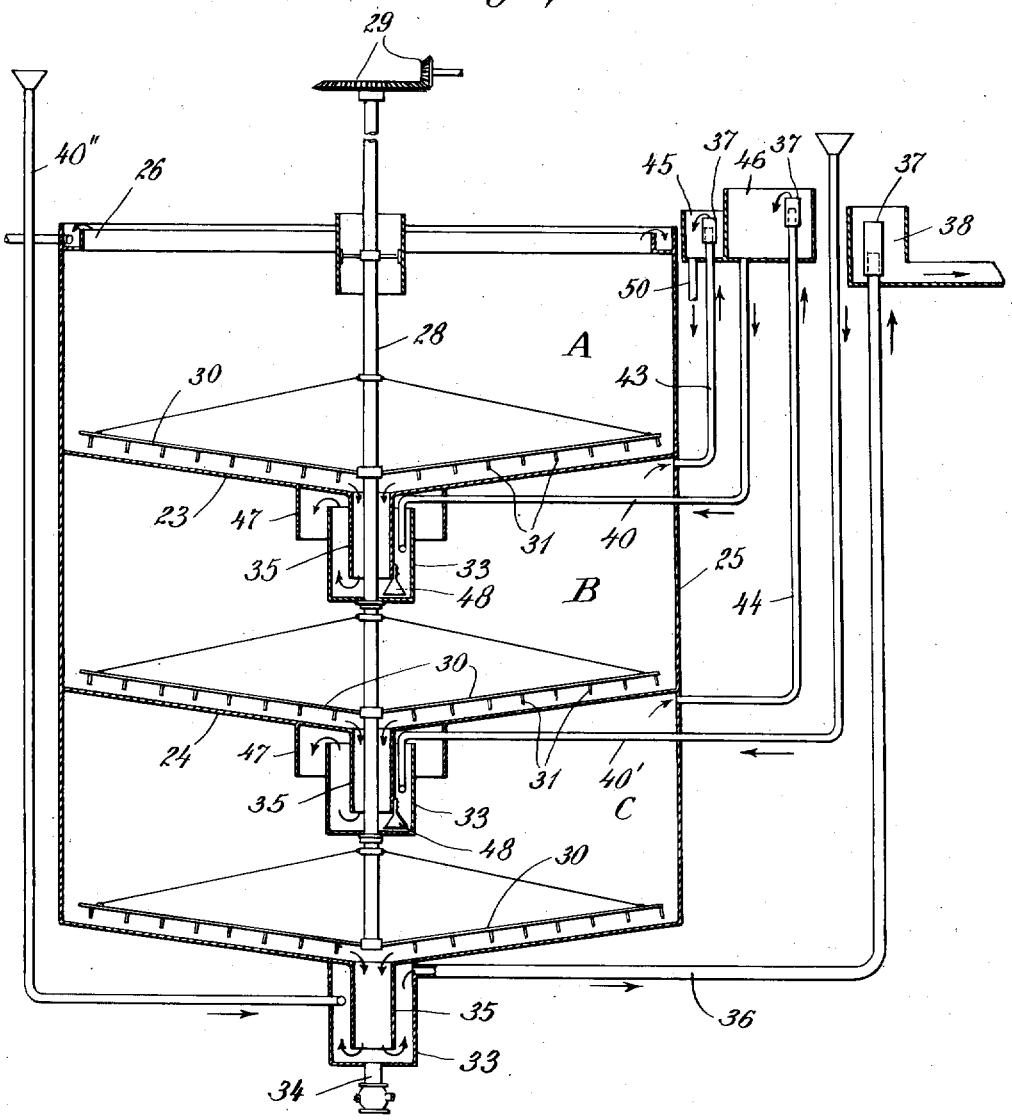
INVENTOR
William A. Stedman
BY
Pennie, Davis, Marvin & Edmonds
ATTORNEYS Reissued July 2, 1940

Re. 21,502

UNITED STATES PATENT OFFICE 21,502

TREATMENT OF PULPS

William Armor Stedman, Westport, Conn., assignor, by mesne assignments, to The Dorr Company, Inc., New York, N. Y., a corporation of Delaware Original No. 1,534,145, dated April 21, 1925, Serial No. 524,127, December 22, 1921. Application for reissue September 17, 1938, Serial No. 230,515

16 Claims. (Cl. 210—55)

This invention relates to improvements in the treatment of pulps and has for its object the provision of an improved method of and apparatus for treating pulps.

Throughout this specification and the appended claims the term pulp is intended to define any mixture of solid material and a liquid. In the industrial arts, and more especially in chemical and metallurgical industries, pulps are subjected to various kinds of treatment. Thus, for example, the treatment of the pulp may involve the removal or separation of the solid material from the liquid, or the treatment may involve the separation by solution in the liquid of a valuable element or elements from worthless or less valuable substances contained in the solid material, or the treatment may involve washing of the solid material to free it from liquid containing dissolved substances. The present invention is particularly concerned with treatment processes of this character, but I wish it to be understood that the invention is not limited in its application to the particular kinds of treatment processes specified above.

The present invention is of particular advantage in the treatment of pulps by continuous counter-current decantation which, in one of its aspects, may be defined as a system of washing finely divided solids, such as chemical precipitates, finely ground ore gangues, and the like, free from liquids containing dissolved materials. Continuous counter-current decantation has also been applied to lixiviation or leaching, wherein the lixiviant is passed continuously through a series of cells into which the matrix to be leached is charged in such a manner as to present the lixiviant highest in content of dissolved materials to the matrix highest in content of the same, while lixiviant free from dissolved materials is added to the cell in which the matrix has been almost entirely exhausted of the material to be dissolved. Many other applications of the principles of continuous counter-current decantation are known in the industrial arts, such as the washing of chemical precipitates, crystals, etc., and the carrying out of chemical reactions, such as those representing the manufacture of caustic soda from soda ash and lime, the manufacture of alum from bauxite and sulfuric acid, the manufacture of borax from Colemanite, the manufacture of barium carbonate from barium sulfide and soda ash, the manufacture of phosphoric acid from rock phosphate, the extraction of iron stains from barytes, etc. In all such treatments of pulps involving continuous counter-current decantation, the present invention is of especial advantage.

For the sake of simplicity, the present invention will be hereinafter particularly described in connection with the separation of finely divided solids from liquids in which they are suspended or the separation of quickly settling solids from those suspended in the same liquid and which settle more slowly. It is to be understood, however, that the present invention is particularly described in connection with this kind of pulp treatment by way of example, and those skilled in the art will readily recognize the application of the invention to such other processes of pulp treatment as hereinbefore mentioned and the advantages of the invention resulting from such applications.

The treatment of pulps involving the removal or separation of solids contained therein or in which such solids are suspended may be advantageously effected by sedimentation in various forms of settling tanks or basins. The well known Dorr thickener or settling apparatus is an example of a settling tank or basin well adapted for this purpose. When a settling tank or basin is used for the continuous segregation of a pulp into two products, one of which is a more or less clear liquid and the other is the solids with a certain amount of liquid entrained therein, continuous removal of the settled solids should be brought about by some method that will insure exact control of the rate of removal of the solids and preferably one that will, without attention, automatically regulate the rate of removal of solids in conformity with the rate of accumulation of solids so that the settling tank may be continuously worked at its best efficiency. The present invention contemplates the improvement in the treatment of pulps involving the removal of solids therefrom by sedimentation in which the discharge of thickened material from the body of pulp undergoing sedimentation takes place automatically in response to the rate of accumulation of solids therein. More particularly, the method of the present invention involves opposing the hydrostatic pressure of the discharging solids by an adjustable hydrostatic pressure obtained from a body of pulp of less density than the discharged thickened material, such as a liquid diluent, or a mixture of discharged thickened material and a liquid diluent.

For the sake of uniformity and simplicity, the mixture of solids and liquids to be treated in accordance with the present invention will throughout this specification and the appended claims be referred to as pulp, the more or less clear liquid withdrawn or decanted from the body of pulp undergoing sedimentation will be referred to as clear solution, the settled solids or thickened material will be referred to as slimes, and the liquid diluent mixed with the slimes, in accordance with the principle of the present invention, will be referred to as wash water.

The novel features of the present invention will be best understood from the following description taken in conjunction with the accompanying drawings, in which:

Fig. 1 is a sectional elevation of a settling tank or basin embodying the invention and particularly adapted for the practice of the method of the invention;

Fig. 2 is a detail sectional view on the section line 2—2 of Fig. 1; and

Fig. 3 is a sectional elevation of another form of apparatus embodying the invention.

Fig. 1 of the accompanying drawings represents the present invention applied to and carried out in a settling tank of the well-known Dorr thickener type. The apparatus consists generally of a relatively shallow tank 5 of considerable diameter having an overflow launder 6 for the removal by decantation of clear solution. Pulp is fed to the tank through a feed boot 7. A slimes-collecting mechanism is operatively suspended within the tank 5. This mechanism consists of a rotatably mounted shaft 8 adapted to be driven from above by any appropriate means such as bevel gear and pinion 9. The shaft 8 carries at its lower end upwardly directed radial arms 10, to the underside of which are secured plows or scrapers 11 so disposed as to work settled solid material towards the center of the tank bottom. The overflow launder 6 is provided with one or more outlet pipes 12 for conveying the clear solution from the tank to appropriate places for disposal or further treatment.

A cylindrical vessel 13 is secured to the underside of the tank 5 and is centrally disposed with respect to the slimes outlet in the bottom of the tank. The vessel 13 is normally closed at its bottom, but is provided with a valved drain-pipe 14 for use in cleaning out the system.

A cylindrical tube 15 depends from the slimes outlet in the bottom of the tank 5 and extends to within a short distance above the bottom of the vessel 13. The precise diameter of the tube 15 is not important provided it is large enough to allow the slimes or settled material to pass therethrough without clogging. The cross sectional area of the cylindrical vessel 13 should be at least twice that of the tube 15 in order to assure the free passage therethrough of the slimes. The vessel 13 and tube 15, arranged as hereinbefore described, form together a device which will be hereinafter referred to as a trap. The elements 13 and 15 constitute the baffle members of this trap, in this instance, tube 15 being downwardly directed and vessel 13 being an upstanding member. It will be understood, however, that if desired, this relation of the elements may be reversed without affecting the functioning of the device as a trap.

An outlet pipe 16 communicates with the vessel 13 near the upper part thereof and extends upwardly beside the tank 5 to a point somewhat below the level of the overflow edge of the launder 6. The upper end of the pipe 16 is provided with an adjustable sleeve 17 by means of which the elevation of the discharge end of the pipe 16 may be varied at will. Various means for adjustably securing the sleeve 17 to the upper end of the pipe 16 may be employed, and in Fig. 1 of the drawings the sleeve is screwed on to the end of the pipe 16. A receiving conduit or basin 18 surrounds the upper end of the pipe 16 and is provided with a discharge spout 19 for the purpose of receiving and directing the flow of material issuing from the end of the pipe 16.

A wash water pipe 20 communicates with the vessel 13 about midway between the top and bottom thereof. This pipe 20 extends through the wall of the vessel 13 and is bent at right angles in an approximately horizontal plane so that a liquid issuing therefrom will swirl around in the annular space between the cylinders 13 and 15. The direction of the stream issuing from the discharge end of the pipe 20 must be such that the stream will have no effect on slimes or thickened material below a level somewhat above the lower end of the tube 15, but will cut up and dilute all slimes rising above that level. If desirable or necessary a nozzle may be provided to increase the effect of the stream issuing from the pipe 20. The upper end of the pipe 20 extends to a point somewhat higher than the upper end of the pipe 16, and is there provided with a funnel 21 to facilitate the introduction into the pipe of liquid or wash water issuing from a supply pipe 22.

The practice of the method of the present invention in the improved apparatus illustrated in Fig. 1 of the accompanying drawings is as follows. When the settling tank 5 has been filled with pulp and an overflow of clear solution is about to commence, the slimes will have collected to a certain amount in the bottom of the tank. Part of the slimes will have passed down through the tube 15 into the trap, which has been previously filled with water. The slimes will then continue to flow into the trap displacing the water therein and forcing it up pipes 16 and 20 until the hydrostatic head of the water in these pipes is sufficient to balance that of the column of combined slimes and solution in the tank and trap. The condition of the system at this point will be as indicated in Fig. 1 of the drawings, where the lighter shading indicates clear solution or water and the heavier shading indicates the slimes. It will be noted that the water in the pipes 16 and 20 stands at a higher level than the solution in the tank. This is due to the fact that we have in this case a column of liquid balancing a column of mixed liquids and solids, the mixture having a higher specific gravity than the liquid alone. With no further addition of solids, the system will remain in the condition indicated indefinitely because it is in a state of perfect equilibrium. The addition of more solids, by feeding pulp into the tank, will cause the slime level to rise in the tank and also in the trap. The rise of the slime level in the trap will force the water still higher in the pipes 16 and 20 until it overflows the discharge end of the pipe 16. At this stage of the operation the elevation of the discharge end of the pipe 16 above the solution level in the tank 5 will be in exact proportion to the difference in level between the surfaces of the settled slimes in the tank and trap respectively.

It is apparent that, by adjusting the height of the overflow or discharge end of pipe 16, which is accomplished by appropriate movement of the adjustable sleeve 17, the depth of slimes in the tank 5 can be regulated and maintained at any desired level. As the slimes accumulate in the tank, the slime level in the trap is forced up until it reaches the discharge end of the wash water pipe 20. If wash water is now supplied through the pipe 22 and funnel 21 to the pipe 20, the stream of wash water issuing from the discharge end of the pipe 20 inside of the trap will mix with and dilute all slimes that have been forced up to that level, and such diluted slimes will be carried away from the trap through the pipe 16. As hereinbefore mentioned, the discharging stream of wash water is so directed that it does not affect the slimes below a level that is still high enough above the lower end of the tube 15 to insure a constant sealing of the trap. The effect is to maintain a constant slime level in the trap, because as fast as the slimes reach this level they are carried away by the wash water. Since the pressure of the wash water on the surface of the slimes in the trap is constant due to the constant elevation of the overflow end of the pipe 16 and since the level of the slimes in the trap is at a constant elevation, as has just been explained, the elevation of the slime level in the tank must also remain constant. That this relationship holds true in practice will be evident from the following discussion:

Assuming that the tank 5 has been filled with pulp out of which the slimes have settled more or less, and asuming that a flow of wash water is passing through the trap and out through the overflow end of the pipe 16, and assuming that the overflow end of the pipe 16 has been adjusted to a certain elevation with regard to the level of the solution in the tank, and assuming that the whole system has reached the state of equilibrium hereinbefore described with the slime level in the trap just below the level of action of the discharging stream of wash water, and assuming that a continuous flow of pulp is fed into the tank, the slimes settling out of this pulp will add their weight to that of the slimes already there. Since the hydrostatic pressure of the wash water is at a fixed point and is just sufficient to balance the pressure of the combined slime and clear solution column, this additional weight results in a movement of the slimes into the trap thereby raising the slime level in the trap to within the range of action of the discharging stream of wash water. This stream of wash water is sufficient to carry away the slimes as rapidly as they get in range thereof. Furthermore, the slimes will rise into the range of this stream at exactly the same rate as they accumulate in the tank. The result is that the slime level in the tank remains at practically the same point regardless of the rate at which the slimes enter the tank provided the elevation of the trap overflow, the feed rate and the specific gravity and settling rate of the slimes remain constant.

It will also be evident from the foregoing discussion that any change in the specific gravity of the slimes, or in their rate of settling or in the elevation of the trap overflow will cause the slime level in the tank to move up or down until a state of equilibrium has been again reached. After which the slime level in the tank will remain fixed until some other change takes place in one or all of the aforementioned variable conditions. It will thus be evident that the equilibrium of the system is stable, because it automatically returns to normal after being disturbed. Since in ordinary practice the variable conditions or changes hereinbefore mentioned will be comparatively small, the change in depth of the slime bed, that is the slime level in the tank 5, will be correspondingly small. A change in the rate of flow of the wash water will have but a slight effect upon the slime level. Such a change will have, owing to the change in friction head of the moving stream, the same effect as a very slight change in elevation of the trap overflow.

The improved method of the invention for removing settled solids from a liquid is applicable in practically all cases where the subsequent step in the treatment process makes it necessary or possible to dilute the settled slimes or thickened material. The method of the invention is especially valuable in countercurrent decantation processes for separating the solution from the slimes of a pulp. Such processes of countercurrent decantation, as heretofore usually practiced, involve the settling of the slimes to as high a density as possible and the withdrawal of the solution as the first step. The settled slimes are then withdrawn and diluted, and the new pulp thus formed is allowed to settle again. This process of dilution and resettlement is repeated as often as may be necessary. To secure the highest efficiency it is of the greatest importance that in each step the slimes should reach the highest possible density and that upon reaching that density they should pass immediately to the next step.

It will be evident to those skilled in the art that the method of the present invention is of particular advantage in effecting the movement of slimes from step to step with a simultaneous dilution, because the automatic regulation of the slime level in each tank will tend to insure a maximum density of the slimes. Furthermore, the freedom from choking or clogging due to the large passageways provided, in addition to the automatic regulation, will practically eliminate the necessity for any addition to that part of the apparatus after it has once been adjusted to handle a certain character and quantity of material.

The large (slimes) passageways with few bends and no valves or constricted places of the improved apparatus of the invention insure a freedom from choking or clogging that is impossible in any system or apparatus using valves or nozzles for regulating the discharge of slimes. A pump for effecting and regulating the discharge of slimes is also subject to difficulties on account of its valves, piston, diaphragm, etc., which difficulties are entirely absent in the improved apparatus of the invention. Where a pump is employed for effecting and regulating the discharge of slimes the necessary power and means for transmitting the same to the pump require an outlay that is very considerable when compared with the means for supplying a stream of wash water under relatively low pressure for effecting the dilution and transfer of the slimes in accordance with the present invention. One of the principal and greatest advantages of the present invention results from the fact that the system is at all times in a state of equilibrium so that no ordinary changes in conditions will necessitate any addition or change in adjustments, whereas all pumping or valve and spigot methods may be said to be in unstable equilibrium because when a change in any condition affecting the slimes occurs, that change has a cumulative effect on the slimes causing them to depart more and more from their normal condition and requiring attention and readjustments to restore the normal condition.

In the practice of the present invention, when a change of some sort causes the slimes to become less dense than usual, the weight of the slime column becomes less. Consequently, the rate at which the slimes move into the trap becomes less, resulting in the slimes being held longer in the tank. This condition naturally tends to increase the slime density bringing it back toward normal. When the slime density increases because of some change, the increased weight of the slime column in the tank causes slimes to flow faster into the trap resulting in a shorter period of detention in the tank and, as before, a tendency to bring the slime density to normal.

When the rate at which the slimes accumulate in the tank changes on account of a change of feed rate or dilution and especially when the trap is receiving slimes at maximum density the change of accumulation rate immediately causes a corresponding change in the rate of flow through the trap so that no readjusting is necessary. This will hold true, when the feed rate increases up to the time when the slimes are passing through the tank too rapidly to reach the desired density. This is a condition that will not ordinarily be reached before the slimes overflow the top of the tank and compel a readjustment of the feed rate, except in cases where the tank is worked with the slime level a considerable distance below the overflow edge.

When the feed rate decreases there will be no change whatever in the trap when the slime is being received there at maximum density, except a slowing down in the rate of slime flow. When the feed stops entirely the slime flow will also stop entirely with the slime level within the tank still near the usual operating point.

When the trap is set to discharge slimes at less than maximum density, a decrease in the feed rate will cause a somewhat greater decrease in the slime flow, resulting in an increase in the slime density until, if the change is great enough or the feed stops entirely, the slime density in the trap will reach the maximum. This is practically the only case, in practicing the method of the invention, where a readjustment of any part of the system is necessary in order to maintain a slime flow of a desired density.

For the purposes of comparison, let us consider the action of a valve or spigot arrangement, where the flow of slimes is caused by gravity and is controlled by adjusting a valve or changing the diameter of the spigot orifice. In such a case, when the slime density becomes less for any reason, its viscosity also becomes less, and consequently, since the hydrostatic head is practically constant, the rate of flow through the valve or spigot orifice will increase. This results in a more rapid movement of the slimes, a shorter period of detention of the slimes in the tank, and a still further decrease in the density of the slimes. In other words, the abnormal condition is aggravated rather than cured. On the other hand when the slime density increases above normal, its viscosity increases, the rate of flow decreases, the period of detention increases with a consequent further increase in the slime density, again aggravating instead of curing the abnormal condition.

In the case of a pump discharging a fixed volume in a given period of time, there is a certain compensating effect when changes in slime density occur, due to the smaller amount of solids per unit of volume when the density is lower and to the greater amount per unit of volume when the density is higher than normal. However, neither the valve, spigot nor pump methods of slime discharge react in any way in response to a change in feed rate or dilution until after that change has caused a change in the slime density at the point of discharge. When the feed rate increases, the tank will inevitably fill up with slimes and overflow unless the condition is discovered in time and the necessary readjustment made. When the feed stops entirely, the valve, spigot and pump systems for slime discharge will empty the solution unless attended to, and then when the feed conditions return to normal more attention and other adjustments are necessary.

The method of and apparatus for removing solids from settling tanks in accordance with the present invention, when once properly adjusted to produce certain results, will continue to produce those results in practically all cases without any attention or change of adjustment although the feed conditions may change within wide limits, whereas, with any other system of slime discharge known to me, regular attention and inspection are required and any changes in feed conditions outside of narrow limits compel immediate readjustments. Summing up, the advantages of the present invention may be briefly stated as follows: (1) automatic regulation of slime density, (2) freedom from choking or clogging, (3) simple construction with consequent low first cost and (4) no moving parts, together with minimum requirements for attendance and repair, thereby insuring low operating and upkeep costs.

The application of the present invention to processes of countercurrent decantation can be very advantageously effected in apparatus of the well known Dorr tray thickener type. This application of the invention requires a slight modification in form but none in principle of operation of the slime flow regulating device hereinbefore described. This aspect of the invention will be understood by reference to Fig. 3 of the accompanying drawings in which there is illustrated an apparatus of the tray thickener type comprising a cylindrical settling tank 25 or compartment having an overflow launder 26 near the upper end thereof. Two transverse trays or shelves 23 and 24 are provided intermediate the top and bottom of the tank 25. These trays are dished or slightly inclined from the periphery towards the center thereof, as is also the bottom of the tank. A slimes collecting mechanism is operatively suspended within the tank and is arranged to work solid or thickened matter settling on the trays 23 and 24 and the bottom of the tank towards central restricted discharge openings provided in these respective members. This mechanism consists of a rotatably mounted shaft 28 adapted to be driven from above by any appropriate means such as a bevel gear and pinion drive 29. The shaft 28 carries a series of upwardly directed radial arms 30 operatively arranged slightly above the trays 23 and 24 and the bottom of the tank respectively. Plows or scrapers 31 are secured to the underside of the arms 30 and are arranged to work settled solid material towards the discharge openings in the trays and in the bottom of the tank.

A cylindrical tube 35 depends from the central discharge opening in the trays 23 and 24 and the bottom of the tank. Cylindrical vessels 33 surround the tubes 35. The upper two of the vessels 33 are open at their tops and closed at their bottoms and are attached by means of a flange in the center of the bottom thereof to the rotatable shaft 28. The upper ends of these two vessels 33 terminate a short distance below the trays 23 and 24 respectively. The lower vessel 33 is secured to the bottom of the tank and is provided with a valved drain pipe 34.

The tray thickener illustrated in Fig. 3 of the drawings has three settling compartments A, B and C. Clear solution is decanted or overflowed from the compartment A by means of the overflow launder 26, and overflow pipes 43 and 44 are provided for the purpose of effecting the removal of clear solution from the compartments B and C respectively. The pipes 43 and 44 are provided at their upper ends with adjustable sleeves 37 for adjusting the effective overflow level of such pipes, and vessels 45 and 46 are provided for receiving the overflow of the pipes 43 and 44, respectively. A pipe 36 communicates with the lowest vessel 33 near the upper end thereof and extending upwardly along the side of the tank 25 is arranged to discharge into a receiving basin 38. The upper end of the pipe 36 is provided with an adjustable sleeve 37 for determining the effective overflow level of this pipe.

The tubes 35 and the vessels 33 form in combination traps of substantially the same type as hereinbefore described. The trap associated with the tray 23 is supplied with wash water by means of a pipe 40 which communicates at its upper end with the vessel 46. The trap operatively associated with the tray 24 is supplied with wash water by means of a pipe 40′, which pipe is supplied with wash water or solution through the funnel at its upper end. The trap associated with the bottom of the tank is supplied with wash water through the pipe 40″. In each of these traps the wash water is introduced at a point sufficiently above the bottom of the downwardly directed baffle member 35 to insure the sealing of the trap by the settled material. A baffle 47 surrounds the upper portion of the two upper vessels 33. The baffles 47 are cylindrical in shape, somewhat larger in diameter than the vessels 33 and are attached to the underside of the trays 23 and 24. The function of these baffles is to prevent the dilute pulp issuing from the two upper traps from mixing with the clear solution in the upper part of the compartments B and C. A scraper 48 is attached to the lower part of the two upper tubes 35, and serves to prevent solids from packing and remaining in the bottom of the cooperating vessels 33.

The operation of the apparatus illustrated in Fig. 3 of the drawings is as follows:

When the apparatus is in operation the movement of slimes into the traps of the respective compartments A, B and C and the dilution of such slimes with wash water will follow the same course as described in connection with Fig. 1. In the traps operatively associated with the trays 23 and 24, the diluted slimes instead of passing out through a pipe as in the apparatus of Fig. 1 will overflow the upper edge of the vessel 33 and passing down through the annular space between the vessel 33 and the baffle 47 will immediately commence settling on the next tray below. The clear solution released by this sedimentation or settlement will accumulate in the upper part of the compartment and will eventually pass out through the proper overflow pipe for each compartment. The overflow from the lowest compartment will rise to an elevation above the solution surface in the top compartment dependent upon the total pressure resulting from the weight of slimes in all the compartments above, a pressure equal to the sum of the pressures developed by the slime columns in all the compartments above. Thus, the next to the bottom compartment will have a possible overflow elevation that is less than that of the bottom overflow by an amount depending upon the amount of slimes in the next to the bottom compartment. The hydrostatic head that it is necessary to overcome in order to introduce the wash water into the trap will be the head of that trap due to the elevation of the overflow from the surrounding compartment. Hence the overflow from the bottom compartment will rise to an elevation sufficiently greater than the overflow from the next compartment above, so that it can be turned directly into the wash pipe leading to the trap in the compartment next above. The same relation between one compartment and the next above holds true throughout the series, and it will be understood that the tank may be divided into as many superposed settling compartments as is desirable.

This arrangement makes it possible to introduce wash water into the lowest tray trap, taking it out of the lowest compartment as an overflow, send it into the next trap above as wash water and take it off from that compartment as an overflow, and so on, upwardly through the series. Meanwhile, the slimes settling in the top compartment flow through and are controlled by the upper trap, and are mixed in that trap with the overflow from the next lower compartment and the resulting mixture resettles in the next to the top compartment. This cycle of operations is repeated with respect to each compartment and associated trap, so that there is a downward movement of slimes through and out of the tank with an upward movement of wash water. These movements of the slimes and wash water in opposite directions combined with the alternate dilutions and settlements give a true countercurrent washing or displacing action The precise course through the apparatus of the slimes, overflow and wash water may be traced as follows. The feed pulp entering the loading well settles in the top compartment, and clear solution overflows into the launder 26 as in ordinary practice. The slimes settle on the top tray 23 and flow into the upper trap. Here the slimes are diluted by wash water or solution entering through the pipe 40, and the resulting mixture overflows the vessel 33 and is subjected to sedimentation on the second tray, the resulting slimes of this second sedimentation flowing to the trap associated with the tray 24. Wash water enters this trap through the pipe 40′ and dilutes the slimes therein and causes them to overflow the vessel 33 and pass into the bottom compartment. The bottom or discharge trap of the apparatus receives the slimes from the bottom compartment and water entering this trap through the pipe 40″ carries the resulting mixture out through the pipe 36 for final disposal. In case it is necessary or desirable to withdraw the slimes from the last or bottom compartment at a high density a pump or other appropriate means may be employed for this purpose; the use of the trap illustrated in Fig. 3 being limited to cases where the discharged slimes can be diluted sufficiently to flow freely.

The water for the final discharge of the slimes enters the bottom trap through the pipe 40″ and with its burden of slimes overflows the adjustable end of the pipe 36. This water has nothing to do with the other features of operation of the apparatus and it is used simply to assist and to regulate the discharge of the finished slimes.

The counter current wash water is introduced into the top of the pipe 40', the elevation of the top of this pipe being sufficient to insure the entry of the wash water into the thickener against whatever pressure may be present. After passing through the trap associated with the tray 24, where it regulates the flow of and dilutes the slimes passing from this tray, the wash water rises through pipe 44 and overflows the adjustable end of this pipe and is received in the vessel or basin 46. From the basin 46 the wash water passes through pipe 40 and enters the upper trap where it again regulates the flow of and dilutes the slimes passing from the upper tray 23. The overflow from the compartment B rises through the pipe 43 and overflows the adjustable end thereof into the vessel or basin 45. From the basin 45 the solution or wash water is withdrawn through a pipe 50 and subjected to whatever step or use is to follow.

The hydrostatic balances present in the apparatus of Fig. 3 are as follows. In the bottom or discharge trap the pressure to be counterbalanced by the dilute pulp column in the pipe 36 will be that due to the weight of all the slimes and solutions in the tank 25. Since the slimes are rising with the water in the pipe 36, the specific gravity of the mixture will be near the average specific gravity of the contents of the tank 25, hence the overflow end of the pipe 36 will be at an elevation about equal to that of the overflow edge of the launder 26, and at times may be even lower. The pressure in the trap associated with the tray 24 will be that due to the slimes and solution in the compartments A and B. This pressure is counterbalanced by a column of clear water in the overflow pipe 44, and hence the overflow end of this pipe will always have a definite elevation above the overflow edge of the launder 26. Since the pressure in the uppermost or top trap will be that due to the slimes and solution in the compartment A, the elevation of the overflow end of the pipe 43 will be above the overflow edge of the launder 26 but below the overflow end of the pipe 44. This lower pressure in the upper trap and the consequent lower elevation of the overflow pipe 43 makes it possible to send the overflow issuing from the pipe 44 directly into the wash water pipe 40 leading to the upper trap. When the overflow from the lowest or bottom trap has been adjusted to counterbalance a certain total amount of slimes in the tank 25, it will maintain that amount continuously although the proportion of the total on each settling surface or tray may vary considerably.

The amount of slimes on each settling surface or tray of the tank will depend on the elevation of the overflow from the compartment below and the relation of that elevation to the elevations of the other overflows. In other words, the column of liquid in each overflow pipe exerts a hydraulic back pressure at the sludge outlet from the compartment above which opposes the discharge of solids therefrom. At the same time, the pulp, its level determined by the overflow launder, exerts and maintains a substantially uniform hydraulic pressure which, in combination with the discharge pressure exerted by accumulation of solids in the compartment, is adequate to balance the back pressure of the overflow column. It follows, therefore, that any accumulation of solids in excess of a predetermined amount will overcome the back pressure and allow solids to discharge through the sludge outlet in proportion to the accumulated excess. For instance, if, with the total amount of slimes held at a certain point by the bottom or discharge trap, and if the other overflow ends are set at points evenly dividing the distance between the overflow from the discharge trap and the overflow edge of the launder 26, then the total amount of slimes will be divided evenly among the several trays. In this case the figure for the overflow elevation for the discharge trap will be the actual elevation when the trap is discharging dilute pulp with a correction to provide for the difference in specific gravity as compared to an overflow of clear solution.

The same advantages as regards control of flow, simplicity, low cost, etc., that accrue when the present invention is applied to a simple thickener or settling tank also appear when the invention is applied to a tray thickener or settling tank. In addition, the application of the invention to a tray thickener or settling tank makes it possible to use the tray thickener for counter-current decantation work with the well recognized advantages of a tray thickener over a series of simple thickeners. When the pulp must be maintained at an elevated temperature the application of the invention to a tray thickener reduces the amount and difficulties of insulation for conserving heat to a minimum. The overflow and wash water pipes will in practice be arranged close against the side of the tank so that they may be covered by the same mass of insulation that covers the walls of the tank. The only exposure to radiation outside the tank itself will be in the overflow boxes or basins. This will usually be relatively small and easily insulated.

I claim:

1. The improvement in the method of treating pulps which comprises continuously discharging thickened material accumulating near the bottom of a body of pulp undergoing sedimentation, continuously overflowing from said body of pulp a substantially clear solution, supplying wash water under pressure to the thickened material while the thickened material is subjected to a hydrostatic pressure developed in part at least by said body of pulp undergoing sedimentation, opposing the discharge of the resulting mixture of wash water and said discharged thickened material by a hydrostatic pressure approximating that to which the thickened material is subjected as aforesaid and obtained from a body of material consisting of discharged thickened material mixed with a liquid diluent, and regulating the accumulation of the body of thickened material by appropriately adjusting said opposing hydrostatic pressure.

2. The combination with a vessel for separating settling solids from a liquid having an opening in the bottom thereof for the discharge of said settling solids, of a solids discharge element depending from the bottom of said vessel and registering with the opening in the bottom thereof, means surrounding and spaced from said element and forming therewith a trap so arranged that discharging solids pass downwardly through said element and upwardly through the space between said element and said surrounding means continuously, and means for introducing a liquid diluent in the space between said element and said surrounding means at a level above the bottom of said solids discharge element, whereby the liquid diluent entering the apparatus mixes with the settled solids that rise to the level at which the liquid enters, but does not affect the settled solids below a level that is sufficiently above the bottom of said solids discharge element to insure the sealing of the trap by the settled solids.

3. The combination with a vessel for separating settling solids from a liquid having an opening in the bottom thereof, of means for the continuous discharge of said settling solids, comprising a cylindrical conduit registering with said opening and secured to and depending from the bottom of said vessel, a second cylindrical conduit surrounding said first mentioned conduit and spaced therefrom and having its lower end closed at a point below the lower end of said first mentioned conduit, and a liquid supply pipe extending through the wall of said surrounding conduit for introducing liquid into the space between said conduits at a level above the bottom of said first mentioned conduit.

4. The improvement in the method of treating pulps which comprises regulating the accumulation of thickened material in a body of pulp undergoing sedimentation by opposing the hydrostatic pressure of discharge excited by said body by a hydrostatic pressure obtained from a body of material consisting of discharged thickened material mixed with a liquid diluent, said hydrostatic pressure being approximately equal to the hydrostatic pressure maintained within the settling vessel.

5. The combination with a vessel for separating settling solids from a liquid having an opening in the bottom thereof for the discharge of said settling solids, of a solids-discharge device associated with said opening and comprising a downwardly directed baffle member and an upstanding baffle member forming therewith a trap for the settled solids, and means for introducing a liquid diluent between said members and above the lower end of said downwardly directed baffle member so that the liquid diluent mixes with the settled solids in the upper portion of said trap but does not affect the settled material below a level which is sufficiently above the lower end of the depending baffle member to insure sealing of the trap by the settled material.

6. The combination with a vessel for separating settled solids from a liquid, having an opening in the bottom thereof for the discharge of said settled solids, of a solids-discharge device associated with said opening and comparing a downwardly directed baffle member and a upstanding baffle member forming with said baffle member a trap for the settled solids, and an inlet conduit for introducing a liquid diluent between said members, said conduit terminating above the lower end of the downwardly directed baffle member, so that the liquid diluent entering the device mixes with the settled solids that rise above the inlet, but does not affect the settled material below a level that is sufficiently above the lower end of the depending baffle member to insure the sealing of the trap by the settled solids.

7. The combination with a vessel for separating settling solids from a liquid having an opening in the bottom thereof of means for the continued discharge of said settling solids, comprising a hollow cylindrical vessel open at its top and bottom and secured to and depending from the bottom of said vessel in a position registering with said opening therein, a second cylindrical element surrounding and spaced from said first mentioned element having its bottom closed and an opening in the top thereof for the discharge of material from the space between said elements, and means for introducing a liquid diluent into the space between said elements at a point above the bottom of said first mentioned element, whereby the liquid diluent entering said space mixed with the settled solids that rise to the upper portion of said space, but does not affect the settled material below a level that is sufficiently above the lower end of the hollow cylindrical vessel to insure the sealing of the trap by the settled solids.

8. In a settling apparatus, a tank having a plurality of transverse trays between the top and bottom thereof dividing the tank into a plurality of settling compartments, each tray having an opening therein and a solids discharge device including a trap associated therewith by which solids settling in the upper compartments are discharged into the lower ones, means for removing the settled solids from the bottom of the tank, a source of wash water under an appropriate hydrstatic head for washing solids out of the trap in the bottom tray, a conduit leading from the upper part of each compartment except the uppermost for conveying clear liquid for washing the solids out of each trap next above, and means for varying the hydrostatic heads in said conduits for adjusting the accumulation of settled solids on the several trays.

9. In an apparatus, a tank having a plurality of transverse trays between the top and bottom thereof, dividing the tank into a plurality of settling compartments, each tray having an opening therein and a solids discharge device including a trap associated therewith by which solids settling in the upper compartments are discharged into the lower ones, a trap in the bottom of the tank comprising cooperating baffle members, means for introducing liquid into the space between said members at a level above the bottom of the solids discharge baffle member and means for carrying away the settled solids at substantially the same rate at which they settle in the tank, a source of wash water under an appropriate hydrostatic head for washing the solids out of the trap in the bottom tray, a conduit leading from the upper part of each compartment except the uppermost for conveying clear liquid for washing the solids out of each trap next above, and means for varying the hydrostatic heads in said conduits for adjusting the accumulation of settled solids on the several trays.

10. In a settling apparatus, a tank having a plurality of transverse trays between the top and bottom thereof dividing the tank into a plurality of settling compartments, each tray having an opening therein and a solids discharge device including a trap associated therewith by which solids settling in the upper compartments are discharged into the lower ones, means for removing the settled solids from the bottom of the tank, a source of wash water under an appropriate hydrostatic head for washing solids out of the trap in the bottom tray, a conduit leading from the upper part of each compartment except the uppermost for conveying clear liquid for washing the solids out of each trap next above, and a baffle associated with each of said traps for directing the solids discharged therefrom downwardly so as to prevent said solids from mixing with the clear solution in each compartment.

11. In a settling apparatus, a tank having a plurality of transverse trays between the top and bottom thereof dividing the tank into a plurality of settling compartments, each tray having an opening therein and a solids discharge device including a trap associated therewith by which solids settling in an upper compartment are discharged into the compartment next below, means for removing settled solids from the bottom of the tank, means for introducing a liquid diluent into each compartment (except the uppermost) near the point of discharge of settled solids into the compartment from the compartment next above, a conduit leading from the upper part of each compartment (except the uppermost) to a receiving vessel exterior of the tank, and means for varying the hydrostatic heads in said conduits for adjusting the accumulation of settled solids on the several trays.

12. In a settling apparatus, a tank having a plurality of transverse trays between the top and bottom thereof dividing the tank into a plurality of settling compartments, each tray having an opening therein and a solids discharge device including a trap associated therewith by which solids settling in an upper compartment are discharged into the compartment next below, a conduit leading from the upper part of each compartment (except the uppermost) to a receiving vessel, means for varying the hydrostatic heads in said conduits for regulating the accumulation of settled solids on the several trays, and means for introducing into each compartment (except the bottom and uppermost) near the point of discharge thereto of settled solids a liquid diluent obtained in part at least from the receiving vessel for the conduit leading from the upper part of the compartment next below.

13. In a tray thickener, upper and lower settling compartments defined by a transverse tray and having means in the upper compartment for the overflow of clarified supernatant liquid, said tray having a discharge outlet for settled solids whereby said compartments are in continuous communication, a trap associated with said outlet and through which solids settling in the upper compartment are discharged to the lower compartment, means for applying at the outlet adjustable hydraulic back pressure opposing the discharge of solids, said means comprising a conduit leading from the upper part of said lower compartment to a receiving vessel and constituting the overflow means for said lower compartment, means for varying the hydrostatic head in said conduit for adjusting the hydraulic back pressure, and means for maintaining in the upper compartment an hydraulic pressure adequate in combination with the discharge pressure exerted by the accumulation of a predetermined amount of solids in said compartment to balance said back pressure, whereby accumulation of solids in the upper compartment in excess of the predetermined amount will overcome back pressure and discharge solids through said outlet in proportion to the excess over the predetermined amount.

14. In a settling apparatus, a tank having a plurality of transverse trays between the top and bottom thereof dividing the tank into a plurality of settling compartments, each tray having an opening therein constituting a discharge outlet for settled solids, a trap associated with each of said openings and through which solids settling in an upper compartment are discharged into the compartment next below, said compartments being in continuous communication through said openings, means for maintaining at each outlet hydraulic back pressure opposing the discharge of solids therethrough, said means comprising a conduit leading from the upper part of the compartment next below to a receiving vessel located exteriorly of the tank, and means for varying the hydrostatic head in said conduit for varying said back pressure and thereby regulating the accumulation of settled solids in the compartment immediately above.

15. In a tray thickener, upper and lower settling compartments defined by a transverse tray, an overflow for clarified supernatant liquid in said upper compartment, a baffled trap discharge opening in said tray, means for applying a predetermined hydraulic back pressure opposing the discharge of solids through said trap-discharge opening, said means comprising a conduit leading from the upper part of said lower compartment and constituting the overflow means of said lower compartment, adjustable means for varying the hydraulic pressure in said conduit, the baffles in said trap discharge opening being so arranged that a hydraulic column of solids and supernatant liquid in the upper compartment will react upon the hydraulic column in said conduit leading from the upper part of said lower compartment, whereby accumulation of solids in the upper compartment in excess of the predetermined amount will overcome back pressure and discharge solids through said trapped discharge opening in proportion to the excess over said predetermined amount.

16. The improvement in the method of treating pulps which comprises discharging the thickened material from a body of pulp undergoing sedimentation in opposition to the back pressure of an adjustable hydraulic column of different density in direct hydraulic communication with the hydraulic column consisting of the body of sedimented material and supernatant liquid, said first hydraulic column extending exteriorly of the body of discharged material, whereby accumulation of solids in excess of an amount predetermined by an adjustment of the adjustable hydraulic column will effect the discharge of said excess.

WILLIAM A. STEDMAN.